(12) United States Patent
Fowler et al.

(10) Patent No.: US 7,614,689 B2
(45) Date of Patent: Nov. 10, 2009

(54) SEAT INTEGRATED TETHER SYSTEM

(75) Inventors: James Hugh Fowler, Novi, MI (US); Kelly Michael Kohlstrand, Wyandotte, MI (US); Heidi Ann Dibble, Canton, MI (US); Bari William Brown, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/763,219

(22) Filed: Jun. 14, 2007

(65) Prior Publication Data

US 2008/0309062 A1    Dec. 18, 2008

(51) Int. Cl.
*A47C 7/62* (2006.01)

(52) U.S. Cl. ............ 297/188.06; 297/188.01; 297/188.04; 297/188.2; 297/224; 297/228.11; 297/228.12; 297/228.13; 297/487

(58) Field of Classification Search ............ 297/188.01, 297/188.06, 188.2, 224, 228.11, 228.12, 297/228.13, 487, 188.04
See application file for complete search history.

(56) References Cited

U.S. PATENT DOCUMENTS

| | | | | |
|---|---|---|---|---|
| 1,147,965 A | * | 7/1915 | Mosher | 297/487 |
| 1,623,259 A | * | 4/1927 | McGregor et al. | 297/487 X |
| 2,330,538 A | * | 9/1943 | Allen | 297/487 X |
| 2,353,316 A | * | 7/1944 | Muller | 297/487 |
| 3,540,775 A | * | 11/1970 | Defleur | 297/188.2 |
| 3,951,486 A | | 4/1976 | Tracy | |
| 4,131,313 A | * | 12/1978 | Jacobs | 297/188.2 |
| 4,311,339 A | * | 1/1982 | Heath | 297/487 |
| 4,506,903 A | * | 3/1985 | Bowermaster | 297/188.2 X |
| 4,545,613 A | | 10/1985 | Martel et al. | |
| 4,597,359 A | | 7/1986 | Moorman | |
| 4,758,020 A | | 7/1988 | Boyd | |
| 4,813,751 A | | 3/1989 | Fenn | |
| 4,832,241 A | | 5/1989 | Radcliffe | |
| 4,846,527 A | * | 7/1989 | Julien et al. | 297/487 X |
| 4,949,890 A | | 8/1990 | Schultz | |
| 5,005,526 A | * | 4/1991 | Parker | 119/751 |
| 5,209,386 A | | 5/1993 | Allison | |
| 5,288,001 A | * | 2/1994 | Locarno | 297/188.06 X |
| 5,354,119 A | * | 10/1994 | Nicholas | 297/224 X |
| 5,358,307 A | | 10/1994 | Shafer et al. | |
| 5,375,879 A | * | 12/1994 | Williams et al. | 297/487 X |
| 5,383,727 A | * | 1/1995 | Rife | 224/275 X |
| 5,474,329 A | * | 12/1995 | Wade et al. | 297/228.11 X |
| 5,505,139 A | | 4/1996 | Storholm et al. | |
| 5,551,616 A | | 9/1996 | Stitt et al. | |
| 5,626,398 A | * | 5/1997 | Wooldridge | 297/488 |
| 5,752,719 A | | 5/1998 | Mitschelen et al. | |
| 6,015,198 A | | 1/2000 | Stair | |
| 6,053,570 A | * | 4/2000 | Stern et al. | 297/188.01 X |
| 6,079,773 A | * | 6/2000 | Hassan | 297/188.06 X |

(Continued)

*Primary Examiner*—Rodney B White
(74) *Attorney, Agent, or Firm*—Shook, Hardy & Bacon LLP (57) ABSTRACT

A seat integrated tether system for use in a vehicle for the secure placement of an article on a vehicle seat. One or more retractable or extendable tethers are adapted for attachment to the side of the vehicle seat. By use of the system with the front passenger seat of a vehicle the driver may have ready access to the contents of the retained article, which may be an item storage article such as an open top bag, case or storage net.

18 Claims, 12 Drawing Sheets

U.S. PATENT DOCUMENTS

| | | | | |
|---|---|---|---|---|
| 6,092,705 | A * | 7/2000 | Meritt | 297/188.06 X |
| 6,276,582 | B1 * | 8/2001 | Alexander | 224/275 |
| 6,305,299 | B1 | 10/2001 | Ragland | |
| 6,533,350 | B1 * | 3/2003 | Rotstein | 297/188.01 X |
| 6,688,506 | B2 | 2/2004 | Schwartz | |
| 6,742,837 | B1 * | 6/2004 | Alexander | 297/188.06 X |
| 6,932,214 | B1 | 8/2005 | Zimet | |
| 6,971,716 | B2 * | 12/2005 | DePaulis et al. | 297/188.01 X |
| 7,309,102 | B1 * | 12/2007 | Davis | 297/188.06 |
| 2004/0155080 | A1 * | 8/2004 | Fialla-Dori | 297/188.2 X |
| 2008/0179924 | A1 * | 7/2008 | Thompson et al. | 297/188.2 |

* cited by examiner

SEAT INTEGRATED TETHER SYSTEM

TECHNICAL FIELD

The disclosed invention relates to systems for the secure placement of an article on a vehicle seat. More particularly, the disclosed invention relates to a seat integrated tether system which allows the secure placement of a variety of articles on the vehicle seat and particularly the front passenger seat for easy access by the vehicle driver.

BACKGROUND OF THE INVENTION

Drivers and passengers in automotive vehicles often place articles such as bags, purses, briefcases, computer cases and purses on the forward facing seat or on the horizontal seating surface of an otherwise unoccupied vehicle seats. Very often the driver places an article on the passenger seat for access during driving. Accordingly, these articles are often placed on the unoccupied front passenger seat or other seats when the vehicle is parked and are left there when the vehicle is in motion. While parked the articles pose no difficulty but that is not necessarily the situation when the vehicle is in motion.

Aware that articles might shift while the vehicle is in motion some drivers and passengers attempt to overcome this concern by using the conventional belt system to secure the article to the seat. However, the conventional belt is not configured to retain such articles in the vehicle seat. Accordingly, what is required is a retention system such as a tethering system that is adaptive to new or existing stowage items that is simple, intuitive, and low cost. This tethering system should also provide additional control and organization of stowage items during vehicle use.

SUMMARY OF THE INVENTION

The disclosed embodiments of the invention provide a seat integrated tether that provides a system for effectively and efficiently securing a variety of articles to a vehicle seat. The tether as used herein generally refers to any device for restraining an article on the seat of a vehicle, such as a tie-down, a belt, a strap or a leash. However, the system disclosed herein is not intended to be used as an occupant restraint system but is instead intended only to be used to restrain articles from movement on or in relation to a vehicle seat.

The seat integrated tether system of the invention utilizes a user-deployable and configurable tether strap, cable, or cord to attach to and maintain control of stowage or container articles. The seat integrated tether system is integrated into a new vehicle seat or into an existing vehicle seat. The system allows for attachment of the article through use of adjustable tethers and attachment rings (such as a D-ring) to existing attachment points on container articles.

Two tethers are provided, one on each side of the vehicle seat for retaining an article. The total length of the combined tethers may be adjusted. The tethers may be attached to the vehicle seat frame by either a retractor (manual or automatic) or by direct attachment. Both of the tethers may be attached by way of a tether retractor, both may be attached directly by a fastener such as a bolt, or one of each may be used. If directly attached the length of the tether is adjustable by an adjustable length strap. Regardless of the embodiment, the combined length of the tethers may be adjusted to adapt to a variety of container sizes, shapes and materials which may be rigid or semi-rigid. Attachment may be made though the use of spring-loaded clips or hooks. The seat integrated tether system may include separate detachable components or may be permanently attached to a seat or seat structure.

The system disclosed herein aids in the control and organization of stowage articles during static and dynamic usage such as driving of the vehicle. The use of the seat integrated tether system disclosed herein is an on-demand device when required and self stowing or removed when not used. The system may also use a supplemental bag, case, or cargo mesh/net bag to contain smaller items or items that do not include attachment points or d-rings. This bag utilizes the same common tethers and attachment points. The functionality of the disclosed system is also adaptive to a seat back folded down to a horizontal position. In this case, the tether straps are adjusted to wrap in a direction opposite to the rear of the seat back and attach to the stowage item or container. In addition, the tether straps disclosed herein may be used to restrain an article positioned on the back of the seat back when the seat back is in its folded position relative to the seat base. The tethers may also be positioned to the rear of the seat back for stowage when not in use with the clip ends connected.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for one constructed embodiment. These specific parameters and components are included as examples and are not meant to be limiting.

Figure 1:
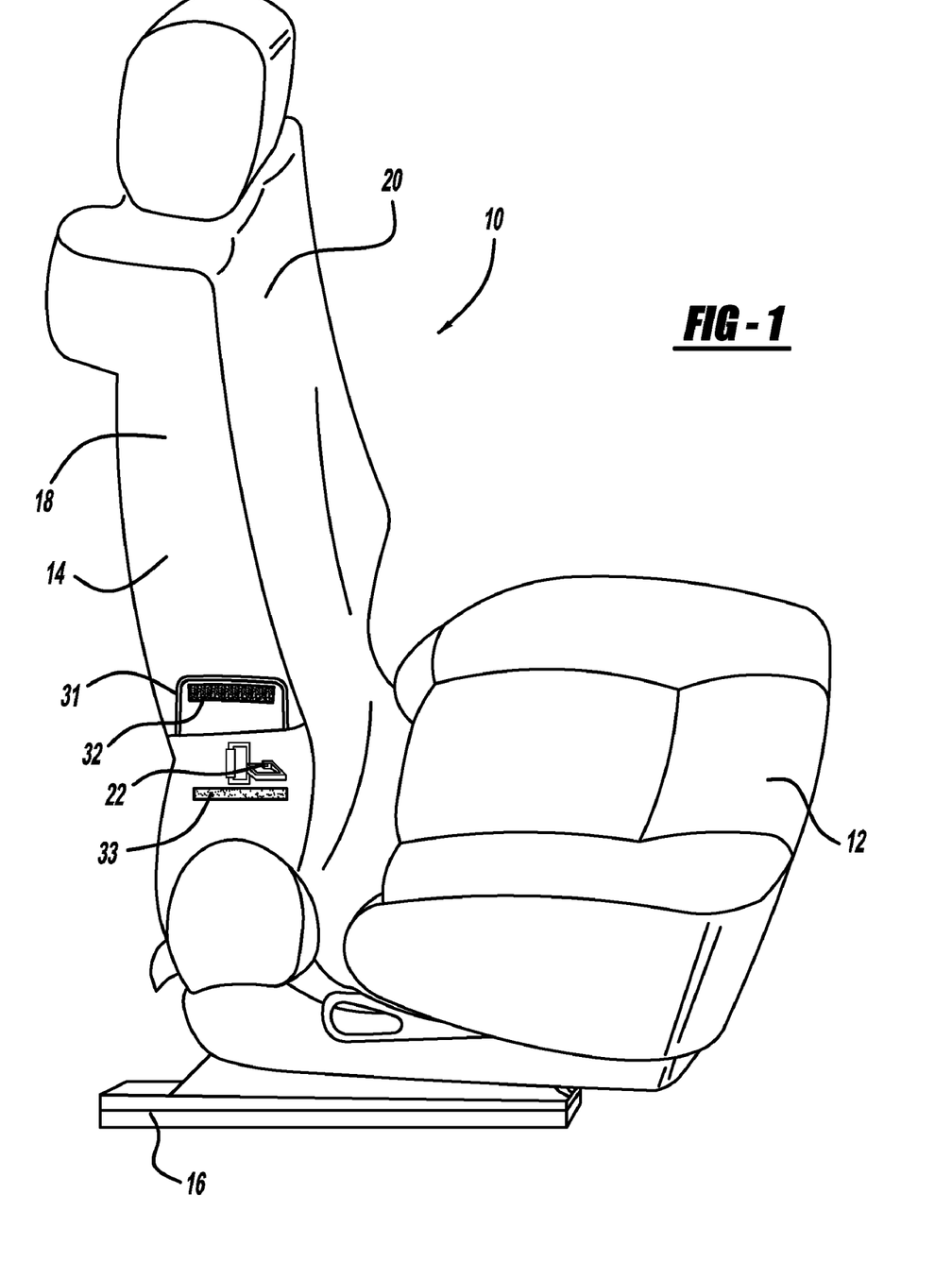
FIG. 1 illustrates a perspective view of an embodiment of the seat integrated tether system of the invention showing a fastener cover in its open position and the adjacent fastener in its retracted position.

Referring to FIG. 1, a seat, typically for use in an automotive vehicle but capable of being used in aircraft and ships as well, is generally illustrated as 10 and is shown in perspective. The seat 10 includes a substantially horizontal seat base 12 and a substantially upright seat back 14. The seat base is attached to the vehicle floor by a seat track assembly 16 as is known in the art.

The seat back 14 has a first side 18 and a second side 20. For purposes of the present invention, the first side 18 may be one or the other of the inboard side or the outboard side of the vehicle seat 10 while the second side 20 may be the other of the outboard side or the inboard side of the vehicle seat 10.

Fixedly attached to the first side 18 of the vehicle seat 10 is a first side tether and clasp assembly 22. A second side tether and clasp assembly 24 is fixedly attached to the second side 20 of the vehicle seat 10 is shown in FIG. 2.

Figure 3:
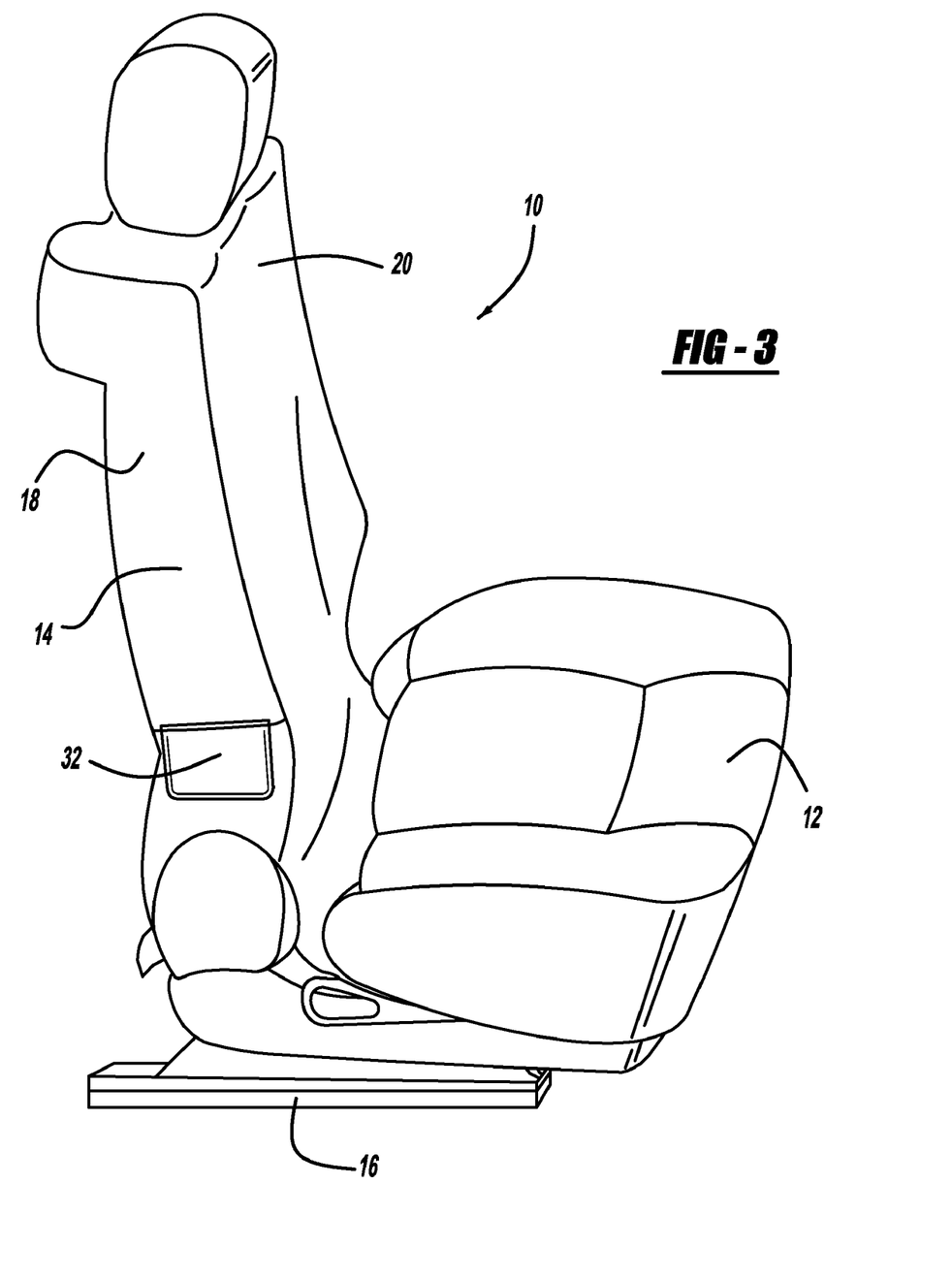
FIG. 3 illustrates the same view as FIG. 1 but shows the cover for the fastener in its closed or concealing position in which both the clasp and the end portion of the tether to which the clasp is attached are concealed.
Figure 5:
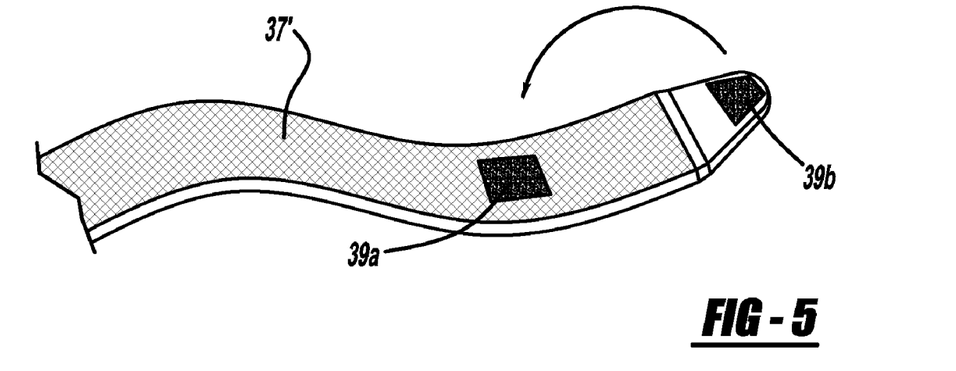
FIG. 5 illustrates a portion of a tether end having a hook-and-loop fastener.
Figure 6:
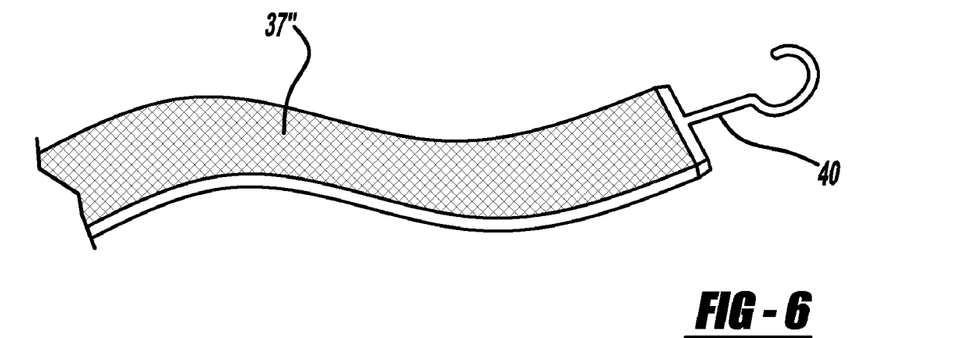
FIG. 6 illustrates a portion of a tether end having a hook fastener.
Figure 7:
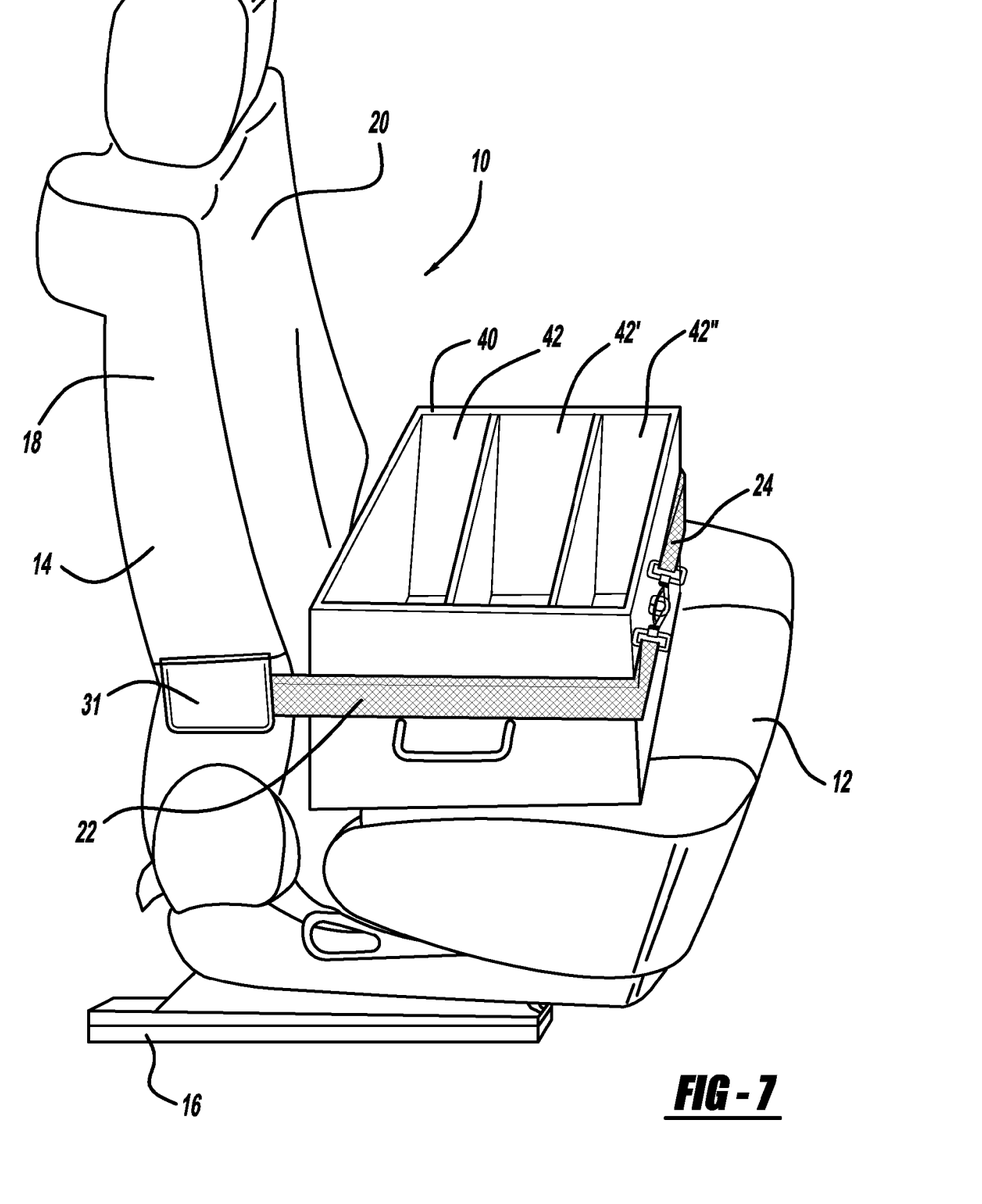
FIG. 7 illustrates the same view as FIG. 1 but shows a multi-spaced organizer tethered to the vehicle seat by the tethers joined to wrap around the article.

The first side tether and clasp assembly 22 and the second side tether and clasp assembly 24 may be used for direct attachment to the article being retained in the seat (as shown in FIGS. 5 and 7) or may be used for being attached to one another for retaining the article (as illustrated in FIGS. 3 and 6).

Figure 2:
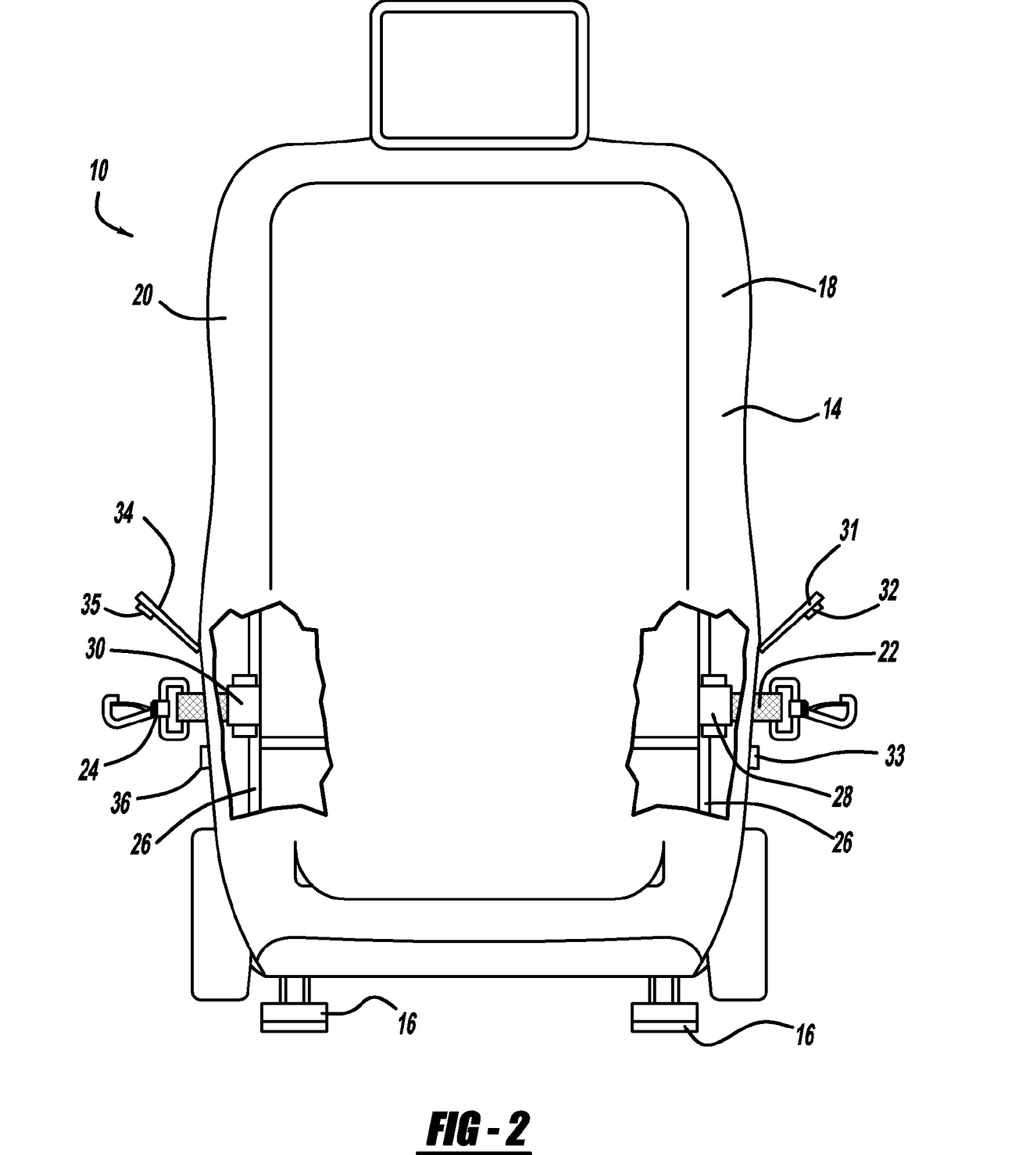
FIG. 2 illustrates a back view of the embodiment of the seat integrated tether system of FIG. 1 and shows a method of attaching the fasteners to the seat frame of the seat using retractors.

As shown in FIG. 2, within the vehicle seat 10 is a seat frame 26. The seat frame 26 partially shown in FIG. 2 is only used for illustrative purposes, and it is to be understood that other seat frame configurations may be used as is known to those skilled in the art.

The first side tether and clasp assembly 22 is either directly or indirectly fixed to the seat frame 26. If indirectly fixed, as shown in FIG. 2, the first side tether and clasp assembly 22 is attached to a first side retractor 28 which is itself attached directly to the seat frame. The second side tether and clasp assembly 24 may also be directly or indirectly fixed to the frame 26. As shown in FIG. 2, the second side tether and clasp assembly 24 is indirectly fixed to the seat frame 26 by way of a second side retractor 30.

As an alternative to the arrangement shown in FIG. 2 in which the first side retractor 28 indirectly attaches the first side tether and clasp assembly 22 to the seat frame 26 and in which the second side retractor 30 attaches the second side tether and clasp assembly 24 to the seat frame 26, it is possible that one or the other or both of the first side tether and clasp assembly 22 and the second side tether and clasp assembly 24 may be directly attached to the seat frame 26 by a known fastener such as a bolt. If, for example, the first side tether and clasp assembly 22 is attached to the seat frame 26 by the first side retractor 28 and the second side tether and clasp assembly 24 is directly attached to the seat frame 26 by a fastener, then the first side tether and clasp assembly 22 may be withdrawn from the first side retractor 28, wrapped around the article to be retained relative to the seat, and then attached to the second side tether and clasp assembly 24. The illustration of FIG. 2 is intended as being instructive and suggestive rather than being limiting.

When not in use, the first side tether and clasp assembly 22 and the second side tether and clasp assembly 24 could be hidden from view by a cover arrangement. An example of such an arrangement is illustrated in FIGS. 1 through 7 in which a first side flap 31 and a second side flap 34 are provided. The free edge of each of the first side flap 31 and the second side flap 34 is releasably attachable to their respective sides of the seat back 14 by a release device such as a hook and loop fastener, as shown. Specifically, the first side flap 31 includes a loop portion 32 while a hook portion 33 is attached to the side of the seat 10 at a place below the first side tether and clasp assembly 22. The second side flap 34 includes a loop portion 35 while a hook portion 36 is attached to the side of the seat 10 at a place below the second side tether and clasp assembly 24.

It is to be understood that while a hook and loop fastener arrangement is illustrated for releasably closing the first side flap 31 and the second side flap 34, other methods of attachment may be used, such as zippers or snaps. In addition, it is to be further understood that while closeable flaps are shown in the figures for concealing the first side tether and clasp assembly 22 and the second side tether and clasp assembly 24, other methods of concealment such as placing the first side tether and clasp assembly 22 and the second side tether and clasp assembly 24 within a blind pocket with a closure device such as a zipper.

In FIG. 3 the first side flap 31 is shown in its closed position and the unused first side tether and clasp assembly is fully concealed therein. In FIGS. 6 through 11 the first side flap 31 is also shown in its closed position even though the first side tether and clasp assembly 22 is in use. In this way the flap may be used while the fastener arrangement of the present invention is also in use.

The first side tether and clasp assembly 22 and the second side tether and clasp assembly 24 (when visible) each are illustrated as having clasps attached to their distal ends for attachment to each other or for attachment to the retained article. Alternative attachments may be used as illustrated in FIGS. 4 through 6.

Figure 4:
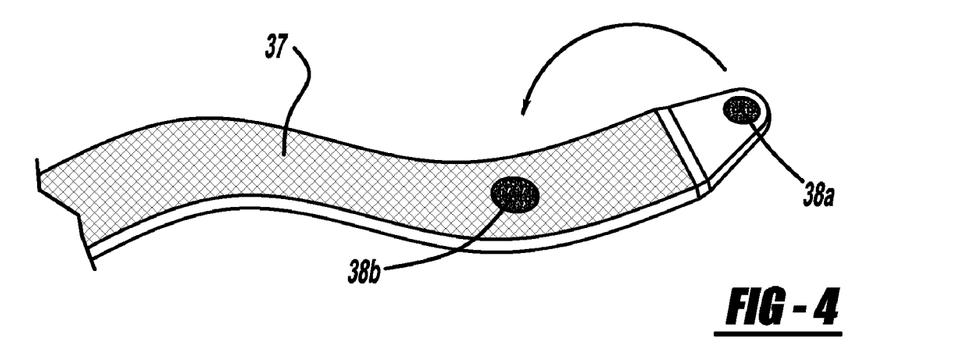
FIG. 4 illustrates a portion of a tether end having a snap fastener.

With respect to FIG. 4, a tether end 37 is illustrated having a snap fastener 38a and a snap fastener base 38b. The snap fastener 38a is releasably attachable to the snap fastener base 38b.

With respect to FIG. 5, a tether end 37' is illustrated having a loop portion 39a and a hook portion 39b. The loop portion 39a is releasably attachable to the hook portion 39b.

With respect to FIG. 6, a tether end 37" is illustrated as having a hook fastener 40. The hook fastener 40 may be releasably attached to the d-ring of an article or to another hook fastener or other type of cooperative fastener.

A variety of item-holding articles may be retained by the integrated tether system of the present invention. Some of these articles are shown in FIGS. 7 through 13.

With reference FIG. 7, an article 41 in the form of a portable article for holding multiple items or a tote is illustrated as being retained in the seat 10. An item having multiple compartments 42, 42', and 42" is illustrated. The illustrated article 41 having multiple compartments is exemplary only and it is to be understood that other items may be used in lieu of or in addition to this article. Any article that may be retained in the vehicle seat and which may be held to the vehicle seat by tethers may be substituted for the illustrated article 41.

As shown, the clasp of the first side tether and clasp assembly 22 and the clasp of the second side tether and clasp assembly 24 are connected with one another in the front of the article 41. While the clasps of the first side tether and clasp assembly 22 and the second side tether and clasp assembly 24 are shown attached toward the front of the article 41, one or the other of the first side tether and clasp assembly 22 or the second side tether and clasp assembly 24 may instead by extended around the article 41 and may be fastened to the other of the first side tether and clasp assembly 22 or the second side tether and clasp assembly 24. For example, the length of the tether of the first side tether and clasp assembly 22 may be adjustable by means of either a retractor or an adjustable belt while the second side tether and clasp assembly 24 may be fixed such that the first side tether and clasp assembly 22 is wrapped substantially around the article 41 to connect with the fixed second side tether and clasp assembly 24.

Figure 8:
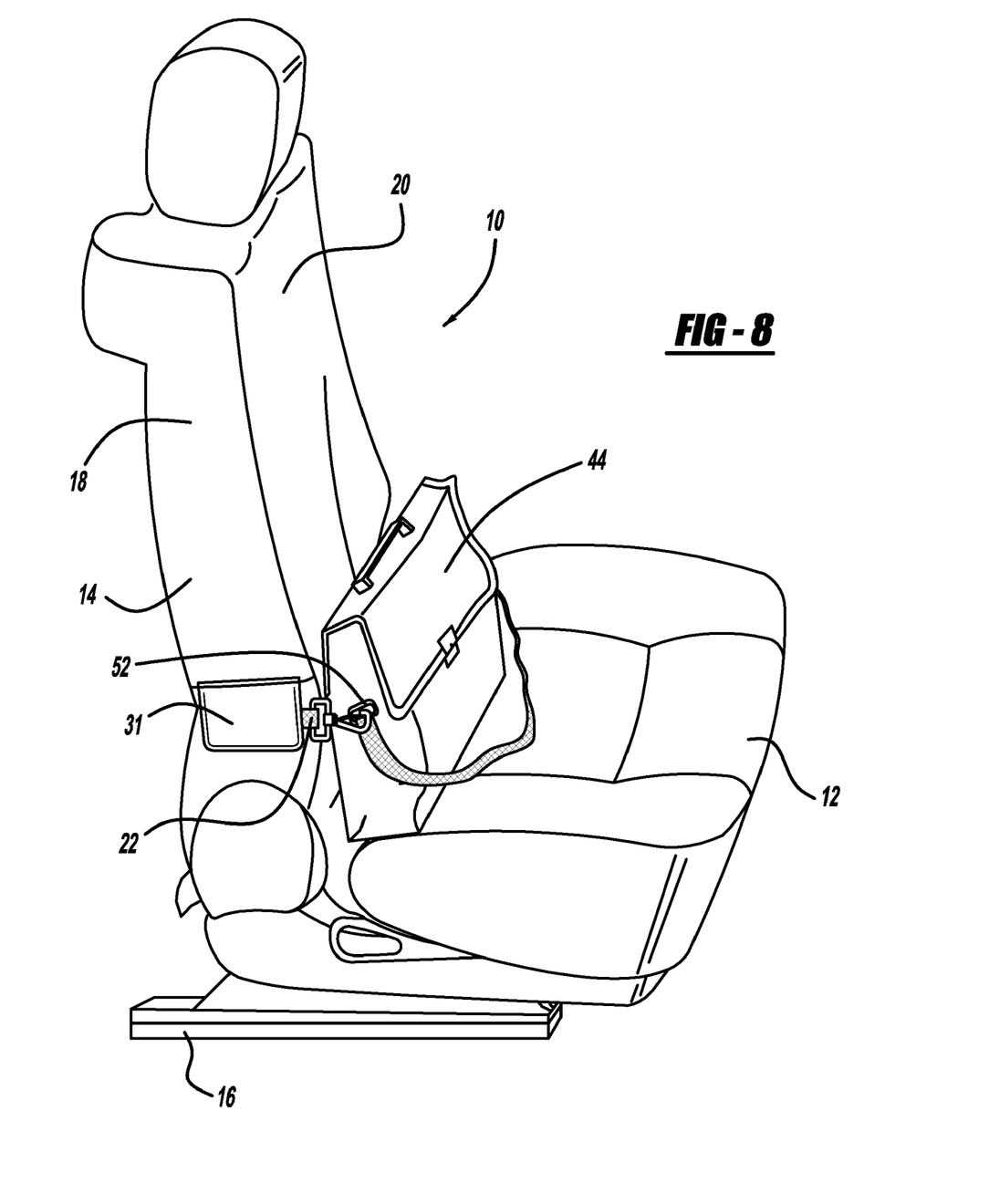
FIG. 8 illustrates the same view as FIG. 1 but shows a briefcase tethered to the vehicle seat with the tethers attached to the shoulder strap rings of the briefcase.

As an alternative to the article 41 shown in FIG. 7, a retained article 44 in the form of a briefcase may be held in the seat 10 as shown in FIG. 8. As illustrated, the article 44 of FIG. 8 is retained by the latch of the first side tether and clasp assembly 22 being attached to the shoulder belt-holding ring of the article 44. The article 44 is also retained on its other side by the second side tether and clasp assembly 24 being attached to the other of the shoulder belt-holding ring attached to the other side of the article 44. While the illustrated article 44 is a briefcase, this figure illustrates how any article having rings may be retained in the seat 10 according to the disclosed system.

Figure 9:
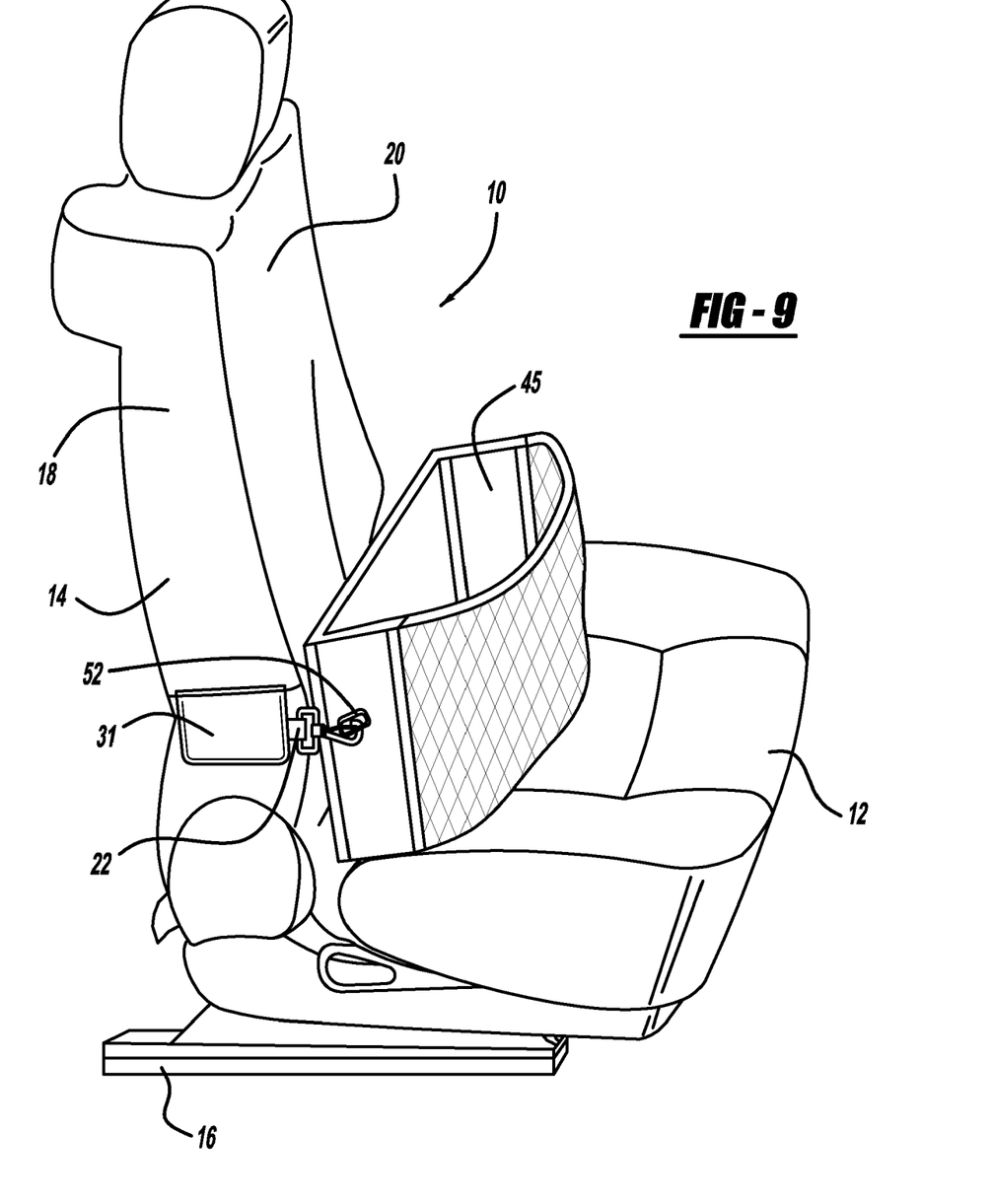
FIG. 9 illustrates the same view as FIG. 1 but shows a cargo net tethered to the vehicle seat with the tethers attached to the d-rings of the cargo net.

In FIG. 9 a cargo net 45 is shown being retained in the seat 10 by the tether coupling method illustrated in FIG. 4. The first side tether and clasp assembly 22 is attached to a d-ring 46 fitted to the side of the retaining net 45. The second side tether and clasp assembly 24 (not shown) would be attached to a d-ring (also not shown) fitted to the far side of the cargo net 45.

Figure 10:
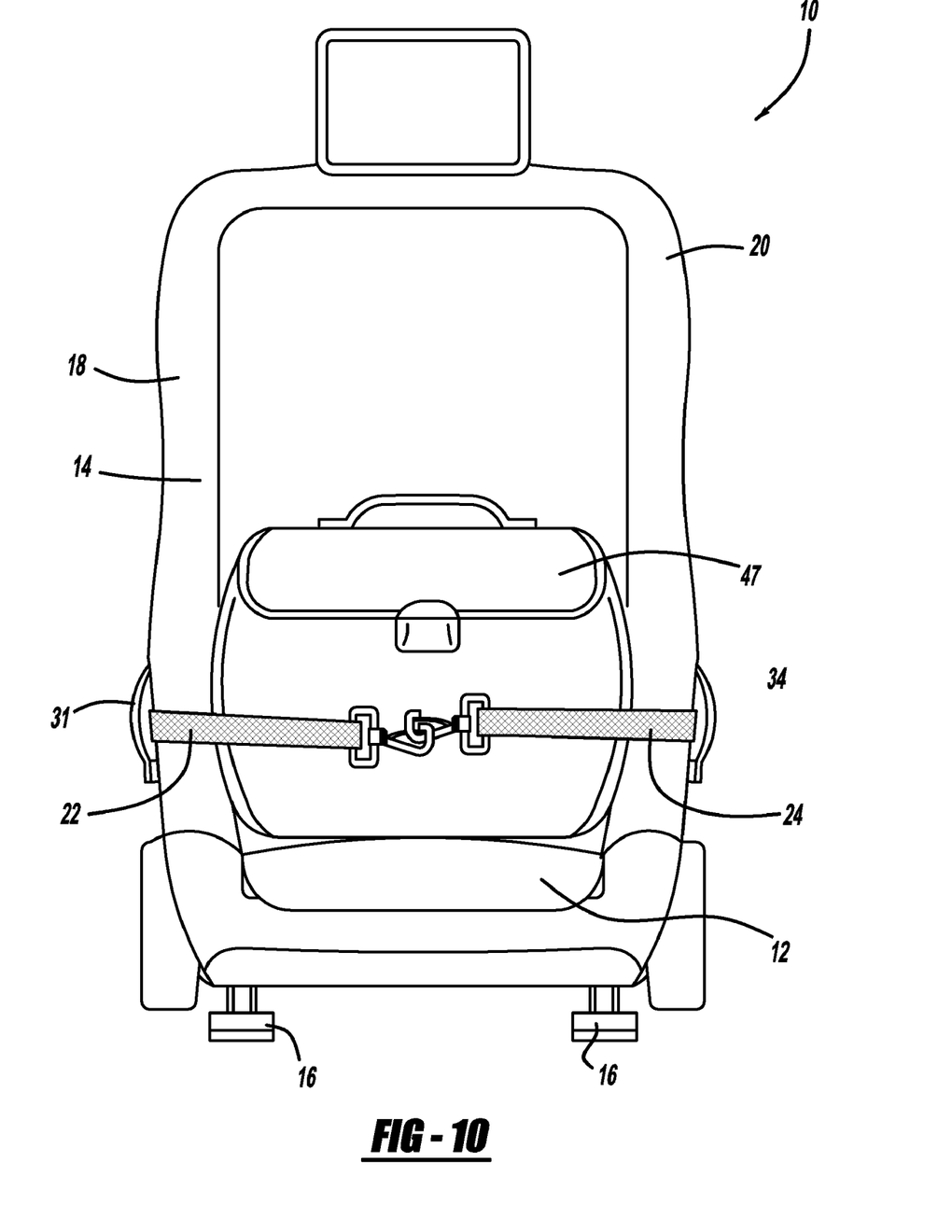
FIG. 10 illustrates a front view of the seat of FIG. 1 and also shows a briefcase in position on the vehicle seat but shows the briefcase held in place by the tethers joined to wrap around the article.
Figure 11:
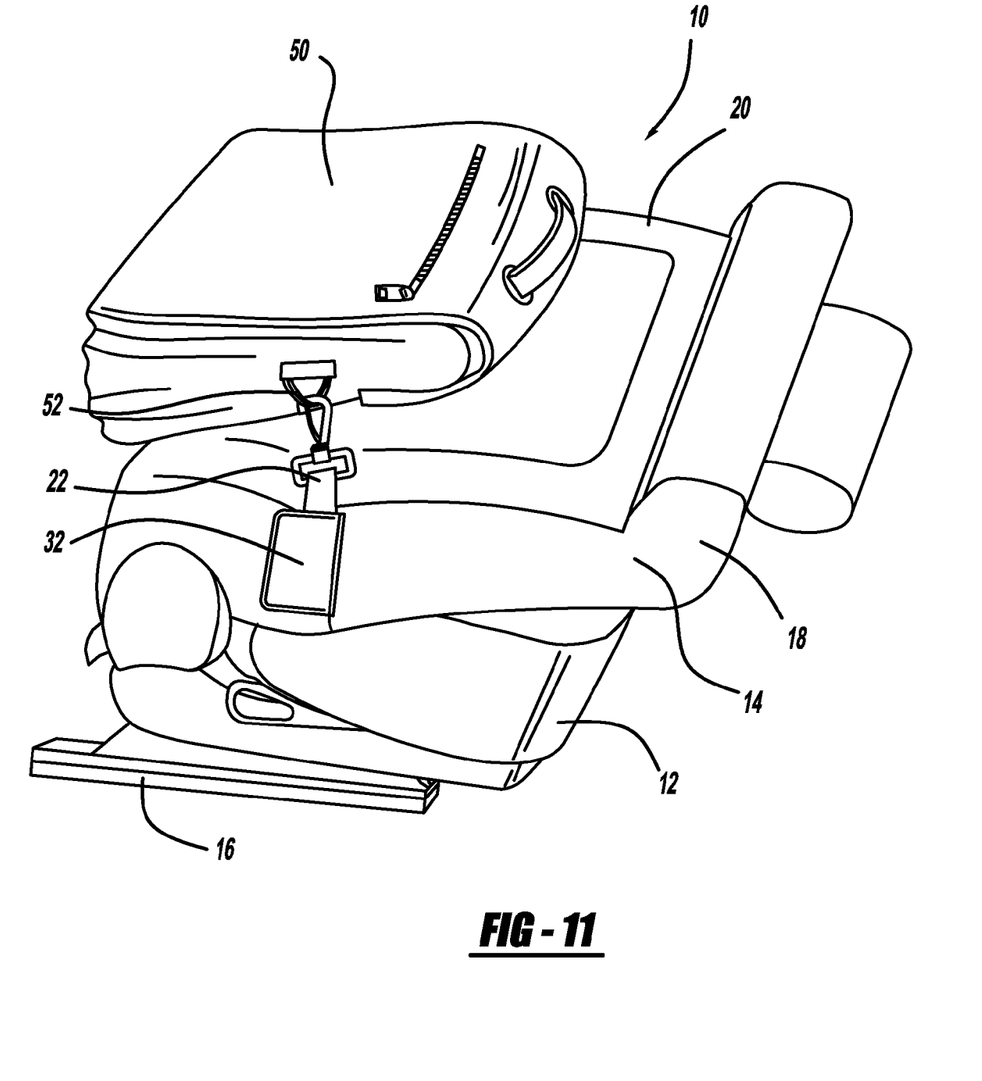
FIG. 11 illustrates a perspective view of the seat integrated tether system with the seat back folded over and the briefcase article positioned on the back of the seat back and held in place by tethers.

In FIG. 10 a briefcase or briefcase-like article 47 is also shown being retained in the seat 10 by the tether coupling method illustrated in FIG. 7. As shown, the first side tether and clasp assembly 22 and the second side tether and clasp assembly 24 are extended around the article 47 and the clasps of each of these fasteners are coupled together at the front of the article 47.

With reference to FIG. 10, an alternate method of retaining an article, illustrated as article 50 in the form of a briefcase or a briefcase-like article, is shown. With the seat back 14 substantially folded down against the seat base 12 the article 50 is secured to the back side of the seat back 14. As illustrated, the clasp of the first side tether and clasp assembly 22 is releasably attached to a shoulder belt ring 52. Not shown but to be understood is that the clasp of the second side tether and clasp assembly 24 is releasably attached to a similar ring positioned on the other side of the article 50.

It is to be understood that while a briefcase or briefcase-like article 50 is shown secured to the back side of the seat back 14, other articles such as the multi-compartment article 40 of FIG. 7 may be attached to the back side of the seat back 14. Any article having multiple rings may be so attached. In addition, an article may be retained to the back side of the seat back 14 by the extended tether method illustrated in FIGS. 7 and 10 and discussed in relation thereto.

Figure 12:
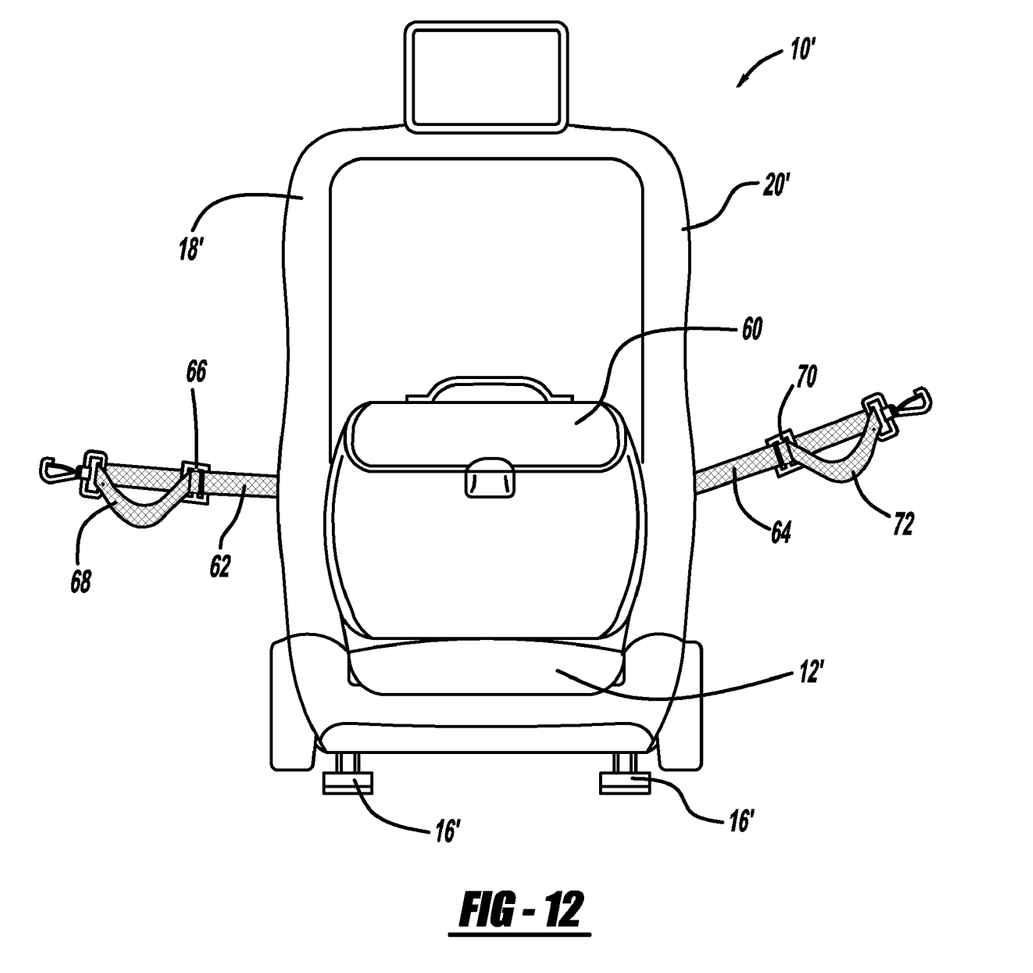
FIG. 12 illustrates a front view of a first alternate embodiment of the disclosed invention and utilizes adjustable length tethers in lieu of the tether retractors shown in FIG. 2 and discussed in relation thereto.

The use of retractors for adjusting the lengths of the tethers of the side fasteners has been discussed above. The lengths of the tethers of the side fasteners may also be adjusted by an alternative method which is shown in FIG. 12. With reference to that figure, a vehicle seat, generally illustrated as 10', is illustrated. The seat 10' includes a substantially horizontal seat base 12' and a substantially upright seat back 14'. The seat base is attached to the vehicle floor by a seat track assembly 16' as is known in the art.

The seat back 14' has a first side 18' and a second side 20'. Fixedly attached to the first side 18' of the vehicle seat 10' is a first side tether and clasp assembly 62. A second side tether and clasp assembly 64 is fixedly attached to the second side 20' of the vehicle seat 10'. The first side tether and clasp assembly 62 includes an adjustment buckle 66 and an adjustable loop portion 68. The second side tether and clasp assembly 64 also includes an adjustment buckle 70 and an adjustable loop portion 68. To adjust the length of the tether portion of the first side tether and clasp assembly 62 the adjustment buckle 66 is moved toward or away from the seat 10' thereby respectively increasing or decreasing the size of the adjustable loop 68, and thereby respectively shortening or elongating the overall length of the first side tether and clasp assembly 62. In the same way to adjust the length of the tether portion of the first side tether and clasp assembly 64 the adjustment buckle 70 is moved toward or away from the seat 10' thereby respectively increasing or decreasing the size of the adjustable loop 72, and thereby respectively shortening or elongating the overall length of the second side tether and clasp assembly 64.

While two adjustable side fasteners are shown in FIG. 12, it is not mandatory that this be the case. As discussed above, length adjustability is only required in one or the other of the side fasteners.

Figure 13:
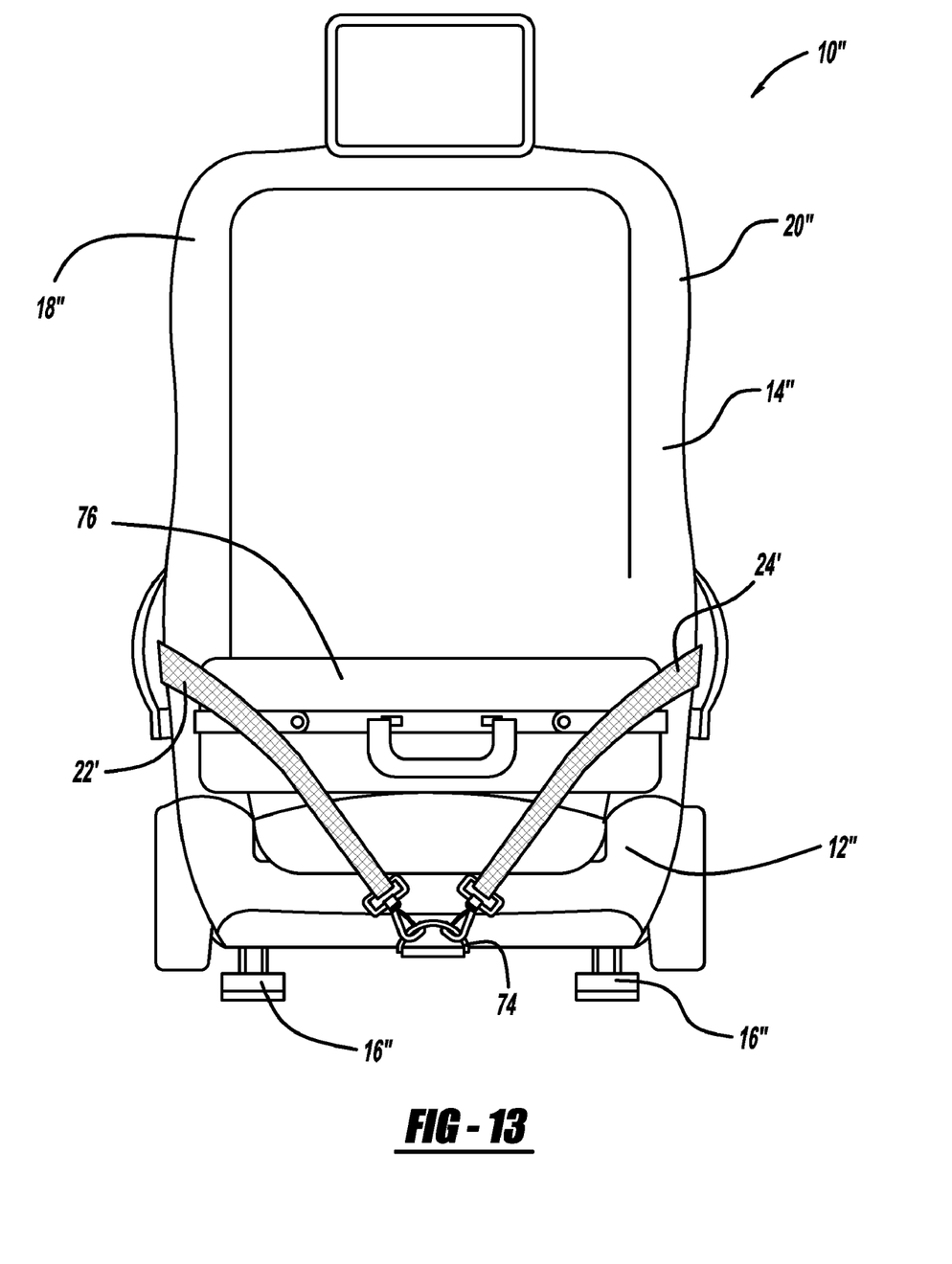
FIG. 13 illustrates a front view of the seat of FIG. 1 but shows an article in the form of a suitcase held in place by tethers attached to a d-ring fixed to the front of the seat base.

A further variation of a seat integrated tether system according to the disclosed invention is shown in FIG. 13. With reference thereto, a seat, generally illustrated as 10", is presented. The seat 10" includes a substantially horizontal seat base 12" and a substantially upright seat back 14". The seat base 12" is attached to the vehicle floor by a seat track assembly 16". The seat back 14" has a first side 18" and a second side 20".

The integrated tether system of the seat 10" of FIG. 13 includes a first side tether and clasp assembly 22' and a second side tether and clasp assembly 24'. A d-ring 74 attached to the front of the seat base 12" The first side tether and clasp assembly 22' and the second side tether and clasp assembly 24' are attached to the d-ring 74, thereby retaining an article 76 (in the form of the illustrated suitcase, for example) in the seat 10".

The configurations discussed above with respect to FIGS. 1 through 13 illustrate a tether system for retaining one or more articles in a vehicle seat that is integral with that seat. While the integrated system is appropriate for new vehicles, it is also possible to retrofit existing seats with the tether system of the present invention whereby many of the same advantages associated with the integrated system can be achieved.

Figure 14:
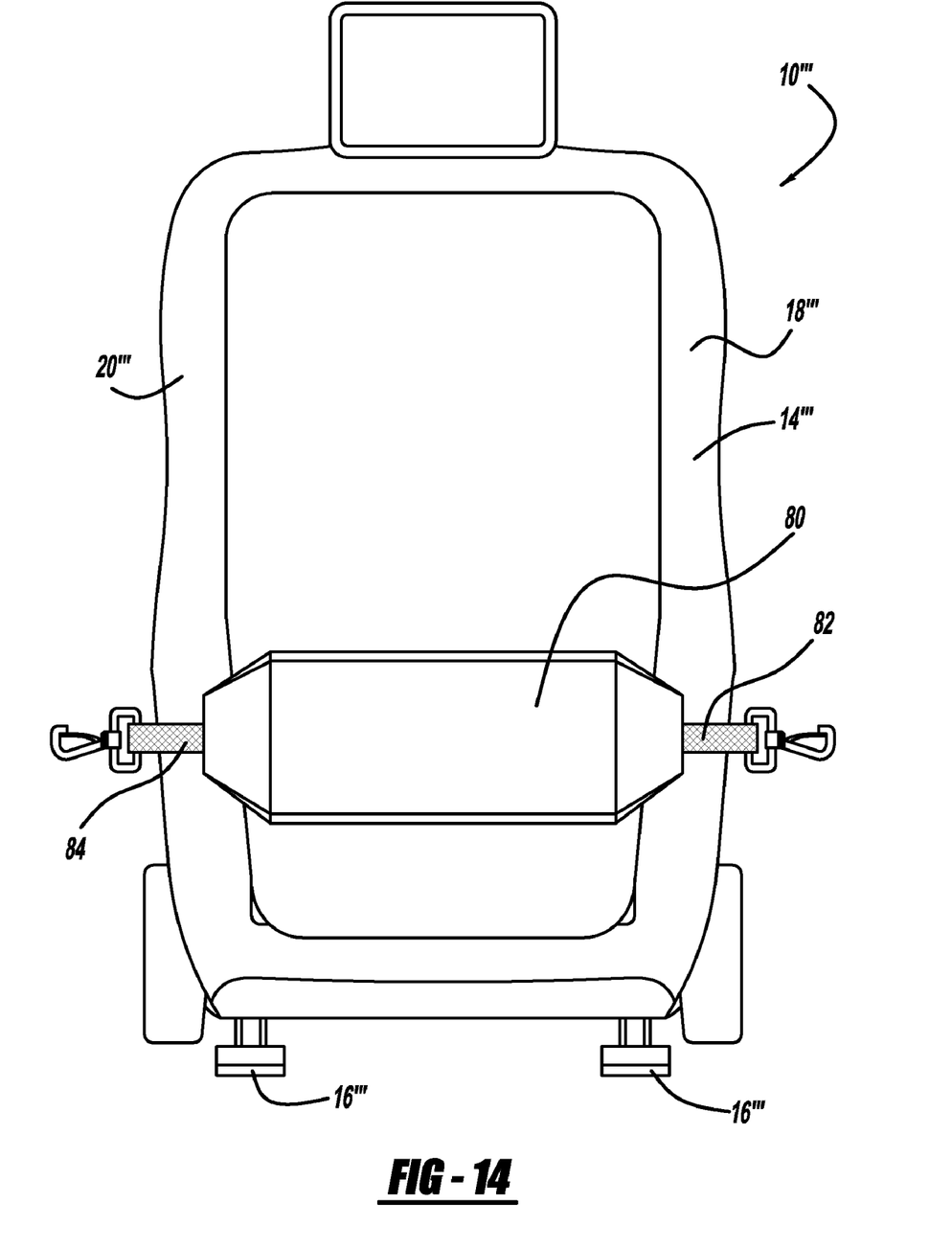
FIG. 14 illustrates a back view of a second alternate embodiment of the disclosed invention and shows a detachable tether assembly fitted to the back of the vehicle seat.

Specifically, and with respect to FIG. 14, a vehicle seat, generally illustrated as 10''', is shown. The seat 10''' includes a substantially horizontal seat base 12''' and a substantially upright seat back 14'''. The seat base 12''' is attached to the vehicle floor by a seat track assembly 16'''. The seat back 14''' has a first side 18''' and a second side 20'''.

An accessory tether system 80 is attached to the back of the seat back 14'''. Attachment of the tether system 80 may be made by permanent fixing to the vehicle seat 10''' using conventional fasteners or may be attached by any of a variety of known adhesives. Other attachment methods, such as hook-and-loop fasteners, may be used. The accessory tether system 80 includes a first side tether and clasp assembly 82 and a second side tether and clasp assembly 84. As discussed above with respect to other variations of the tether system of the present invention, one or both of the first side tether and clasp assembly 82 or the second side tether and clasp assembly 84 may be fixedly attached to the accessory tether system 80 while the other (or both) of the fasteners may be adjustable by use of a retractor or by an adjustable tether such as that shown in FIG. 12 and described in conjunction therewith.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A tether system for use in association with a vehicle seat, the vehicle seat having a first side half and a second side half, the system comprising:
   an article for holding one or more items disposed on the vehicle seat;
   a tether assembly adapted to be attached to the vehicle seat, the tether assembly including a first fastening portion adapted to be attached to the first side half of the seat and a second fastening portion adapted to be attached to the second side half of the seat, said first fastening portion and said second fastening portion being fitted to said retaining article, said tether assembly further including a first retractor adapted to be attached to said first side half of the seat, said first fastening portion being fixed to said first retractor whereby the movement of said retaining article relative to the vehicle seat is limited.

2. The tether system of claim 1 wherein said retaining article is a multi-spaced organizer.

3. The tether system of claim 1 wherein said retaining article is a briefcase.

4. The tether system of claim 1 wherein said first fastening portion includes a latch.

5. The tether system of claim 4 wherein said first fastening portion includes an adjustable belt portion.

6. The tether system of claim 1 wherein each of said first fastening portion and said second fastening portion includes a latch.

7. The tether system of claim 1 further including a second retractor adapted to be attached to the second side half of the seat, said second fastening portion being fixed to said second retractor.

8. The tether system of claim 1 wherein the vehicle seat includes a back and wherein at least one of said first fastening portion or said second fastening portion is adapted to be attached to said back.

9. The tether system of claim 1 wherein said tether assembly further includes a removable cover for covering at least a portion of at least one of said first fastening portion or said second fastening portion.

10. The tether system of claim 9 wherein said removable cover is releasably attachable by hook-and-loop fasteners.

11. A tether assembly operatively associated with a vehicle seat having a first side half and a second side half, the tether assembly retaining an article for holding one or more items on the vehicle seat, the assembly including:
    a first fastening portion attached to the first side half of the vehicle seat, said first fastening portion having a length;
    a second fastening portion attached to the second half of the vehicle seat, the second fastening portion having a length, at least one of said length of said first fastening portion or said length of said second fastening portion being adjustable as required to retain the article on the vehicle seat; and
    a first retractor attached to said first side half of the seat, said first fastening portion being fixed to said first retractor.

12. The tether assembly of claim 11 wherein said first fastening portion and said second fastening portion are fastenable with one another to retain the article on the vehicle seat.

13. The tether assembly of claim 11 wherein said first and second fastening portions are fastenable to the article for retaining the article on the vehicle seat.

14. The tether assembly of claim 11 wherein said first fastening portion includes a latch.

15. The tether system of claim 11 wherein each of said first fastening portion and said second fastening portion includes a latch.

16. The tether system of claim 11 further including a second retractor attached to the second side half of the seat, said second fastening portion being fixed to said second retractor.

17. A tether system for use in association with a vehicle seat, the vehicle seat having a first side half and a second side half, the system comprising:
    an article for holding one or more items adapted to be disposed on the vehicle seat;
    a tether assembly adapted to be attached to the vehicle seat, the tether assembly including a first fastening portion adapted to be attached to the first side half of the seat and a second fastening portion adapted to be attached to the second side half of the seat, said first fastening portion and said second fastening portion being fitted to said retaining article, said tether assembly further including a removable cover for covering at least a portion of at least one of said first fastening portion or said second fastening portion.

18. The tether system of claim 17 wherein said removable cover is releasably attachable by hook-and-loop fasteners.

\* \* \* \* \*